United States Patent
Gallo Jaramillo

(10) Patent No.: US 12,508,750 B2
(45) Date of Patent: Dec. 30, 2025

(54) MOLDING METHOD FOR MAKING A MONOLITHIC COMPONENT INTERNALLY PROVIDED WITH AT LEAST ONE CAVITY INSIDE

(71) Applicant: AUTOMOBILI LAMBORGHINI S.P.A., Sant'Agata Bolognese (IT)

(72) Inventor: Juan Pablo Gallo Jaramillo, Bologna (IT)

(73) Assignee: AUTOMOBILI LAMBORGHINI S.P.A., Sant'Agata Bolognese (IT)

( * ) Notice: Subject to any disclaimer, the term of this patent is extended or adjusted under 35 U.S.C. 154(b) by 69 days.

(21) Appl. No.: 18/003,378

(22) PCT Filed: Jul. 5, 2021

(86) PCT No.: PCT/IB2021/055996
§ 371 (c)(1),
(2) Date: Dec. 27, 2022

(87) PCT Pub. No.: WO2022/009061
PCT Pub. Date: Jan. 13, 2022

(65) Prior Publication Data
US 2023/0311374 A1    Oct. 5, 2023

(30) Foreign Application Priority Data

Jul. 8, 2020   (IT) .................. 102020000016498

(51) Int. Cl.
*B29C 43/36*   (2006.01)
*B29C 43/12*   (2006.01)
(Continued)

(52) U.S. Cl.
CPC .......... *B29C 43/3642* (2013.01); *B29C 43/12* (2013.01); *B29C 43/50* (2013.01);
(Continued)

(58) Field of Classification Search
CPC ..... B29C 43/3642; B29C 43/12; B29C 45/50; B29C 2043/3652; B29C 2043/3665; B29C 33/505; B20L 2022/00
See application file for complete search history.

(56) References Cited

U.S. PATENT DOCUMENTS 3,290,728 A * 12/1966 Pratt ....................... B29C 49/44
                                                              425/389
2002/0146529 A1* 10/2002 Lang ..................... B29C 70/548
                                                              428/36.9

FOREIGN PATENT DOCUMENTS

CN       101835677 A      9/2010
CN       105665503 B  *  10/2017
(Continued)

OTHER PUBLICATIONS

International Search Reported dated Oct. 6, 2021 from counterpart PCT App No. PCT/IB2021/055996.
(Continued)

*Primary Examiner* — JaMel M Nelson
*Assistant Examiner* — Erica Hartsell Funk
(74) *Attorney, Agent, or Firm* — SHUTTLEWORTH & INGERSOLL, PLC; Timothy J. Klima

(57) ABSTRACT

A molding method for making a monolithic component made of C-SMC and internally including a cavity, including preparing a press including first and second half molds and movable side carriages defining a molding space, and placing a core inside the molding space. The core comprises a membrane, delimiting a containing space shaped to form the cavity, and at least one connector engaged with the membrane. The method includes wrapping a charge of material to be molded around the core, fixing the core inside one between the first and the second half molds, and filling the containing space of the membrane with a filling material. After closing the half molds, applying a molding pressure
(Continued)

and then emptying the containing space of the filling material and, after opening the half molds, removing the core from the molded monolithic component.

14 Claims, 3 Drawing Sheets

(51) Int. Cl.
*B29C 43/50* (2006.01)
*B29L 22/00* (2006.01)

(52) U.S. Cl.
CPC ................. *B29C 2043/3652* (2013.01); *B29C 2043/3665* (2013.01); *B29L 2022/00* (2013.01)

(56) References Cited

FOREIGN PATENT DOCUMENTS

| DE | 102017204962 A1 | 9/2018 |
|----|-----------------|--------|
| EP | 3628475 A3 | 8/2020 |
| JP | 2007276428 | 10/2007 |
| JP | 2008073876 A | 4/2008 |
| WO | 9851480 A1 | 11/1998 |
| WO | 2014064784 A1 | 5/2014 |

OTHER PUBLICATIONS

Japanese Office Action dated Feb. 18, 2025 from counterpart Japanese App No. 2023-500994.
Chinese Office Action dated Jul. 30, 2025 from counterpart Chinese App No. 202180048687.4.

* cited by examiner

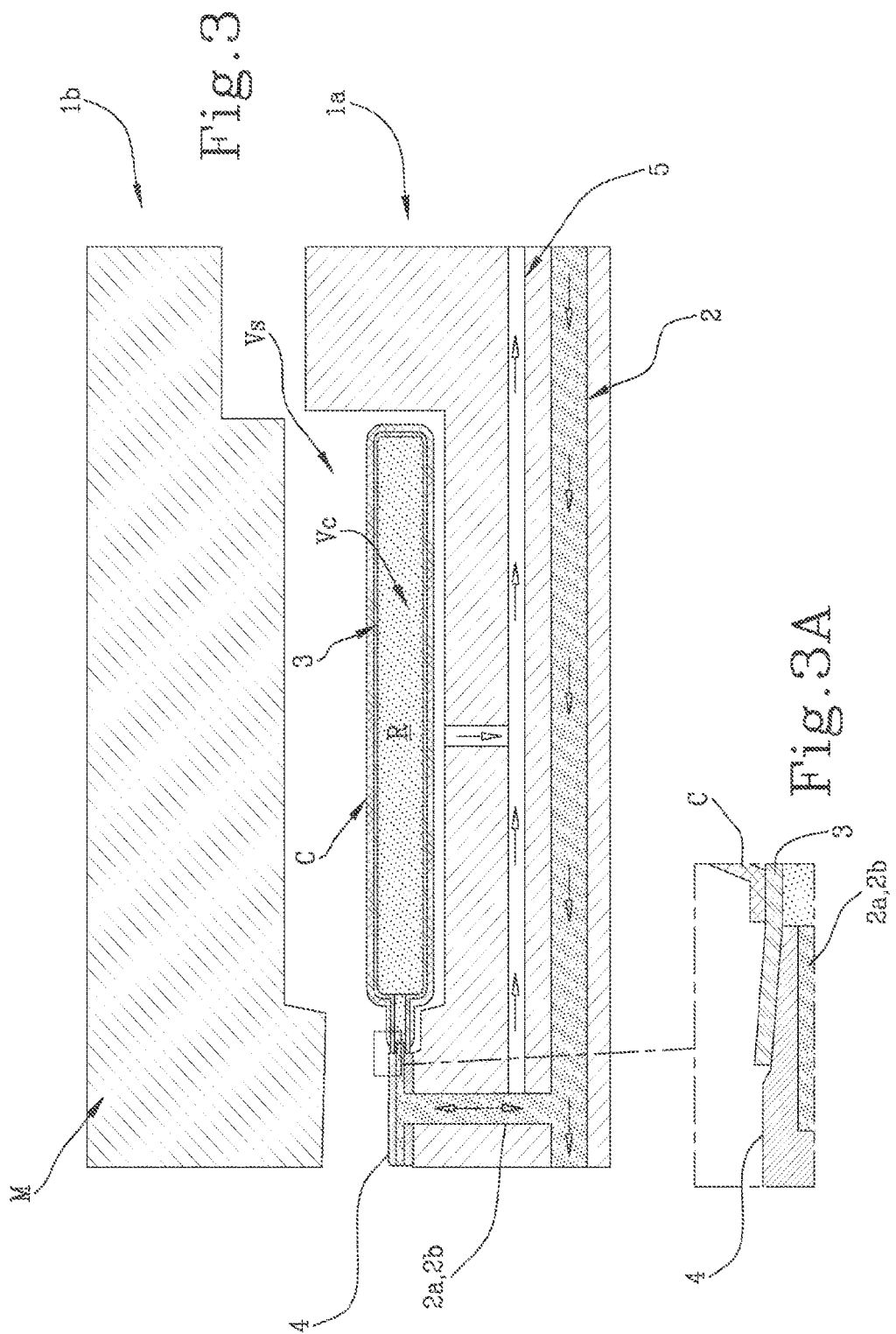

MOLDING METHOD FOR MAKING A MONOLITHIC COMPONENT INTERNALLY PROVIDED WITH AT LEAST ONE CAVITY INSIDE

This application is the National Phase of International Application PCT/IB2021/055996 filed Jul. 5, 2021 which designated the U.S.

This application claims priority to Italian Patent Application No. 102020000016498 filed Jul. 8, 2020, which applications are incorporated by reference herein.

TECHNICAL FIELD

This invention relates to a moulding method for making a monolithic component internally provided with at least one cavity, specifically a monolithic component made of C-SMC, and a machine for moulding a hollow monolithic component, used widely in the automotive field in particular for manufacturing parts from C-SMC (Carbon Sheet Moulding Compound).

BACKGROUND ART

At present, C-SMC parts are made using traditional compression moulding techniques which consist in using a press to apply a force capable of shaping a charge of C-SMC. This moulding technique produces single-walled monolithic parts that are relatively inexpensive, rigid and complex.

Also known are technologies where components made of CFRP (Carbon Fibre Reinforced Polymer) are processed to create very rigid, high-strength parts. These properties are enhanced by the possibility of moulding closed shapes which are useful for the production of Body in White (BiW) structural parts.

Disadvantageously, traditional techniques of processing C-SMC parts and technologies used for the production of CFRP components have inherent drawbacks in terms of the mechanical properties of the finished parts, costs and takt time.

The moulding technique used for C-SMC parts does not allow working with parts having hollows inside them. The technique used for CFRP components, on the other hand, is expensive and its productivity is unable to meet market demands.

DISCLOSURE OF THE INVENTION

The technical purpose of this invention, therefore, is to provide a moulding method for making a monolithic component internally provided with at least one cavity and a machine for moulding a hollow monolithic component to be able to overcome the above mentioned disadvantages of the prior art.

The aim of this invention, therefore, is to provide a moulding method which allows producing monolithic elements, specifically from C-SMC, which are hollow and also have complex shapes.

Another aim of this invention, therefore, is to provide a moulding method which allows producing hollow monolithic elements from C-SMC at a lower cost than traditional technologies.

The technical purpose indicated and the aims specified are substantially achieved by a moulding method and a machine comprising the technical features set out in one or more of the appended claims. The dependent claims correspond to possible embodiments of the invention.

More specifically, the technical purpose is achieved by a moulding method for making a monolithic component internally provided with at least one cavity, specifically a monolithic component made of C-SMC, comprising the steps of preparing a press comprising a first half mould and a second half mould defining a moulding space between them, one between the first and the second half mould being moved by an oil circuit, and the other between the first and the second half mould being stationary.

In a possible embodiment, the press also comprises side carriages movable to act in conjunction with the half moulds to define the moulding space and to allow moulding hollow monolithic components having undercuts.

The method of this invention also comprises the step of placing at least one core inside the moulding space, where the core comprises a membrane that delimits a containing space which is shaped to form the at least one cavity of the monolithic component, and at least one connector that is engaged with the membrane and configured to allow filling the containing space, and the step of wrapping a charge of material to be moulded around the core, specifically a charge of C-SMC, so that the core is at least partly immersed in the charge.

The method of this invention also comprises the steps of fixing the core inside one between the first and the second half mould, specifically the stationary half mould, filling the containing space of the membrane with a filling material through the connector and, after closing the half moulds (and if necessary, where present, the carriages), applying a moulding pressure on the charge of material to form the monolithic component.

After the aforesaid steps, the method according to this invention also comprises the steps of emptying the containing space of the filling material and, after opening the half moulds (and if necessary, where present, the carriages), removing the core from the moulded monolithic component.

More specifically, the technical purpose is also achieved by a machine for moulding a hollow monolithic component, specifically a C-SMC component, configured to implement a method according to the foregoing and comprising a press that is provided with a first half mould and a second half mould defining a moulding space between them and where one between the first and the second half mould is movable and the other between the first and the second half mould is stationary. In a possible embodiment, the press also comprise side carriages movable in such a way as to allow moulding a hollow monolithic component having undercuts.

The machine according to this invention also comprises at least one core, placed inside the moulding space and comprising a membrane that delimits a containing space which is shaped to form the at least one cavity of the monolithic component, the core also comprising at least one connector that is engaged with the membrane and configured to allow filling the containing space. The machine of this invention also comprises an oil circuit that is configured to move the first or the second half mould, whichever is the movable one, and, if necessary, the side carriages, and a vacuum circuit configured to create a negative pressure action in the moulding space.

Further features and advantages of this invention are more apparent in the indicative, hence non-limiting, description of an embodiment of a moulding method and machine for making a hollow monolithic component, specifically a C-SMC component.

BRIEF DESCRIPTION OF DRAWINGS

The description is set out below with reference to the accompanying drawings which are provided solely for purposes of illustration without restricting the scope of the invention and in which:

FIG. 3 shows a schematic view of another embodiment of a machine according to this invention;

FIG. 3A shows a schematic view of a detail from FIG. 3.

DETAILED DESCRIPTION OF PREFERRED EMBODIMENTS OF THE INVENTION

Figure 1:
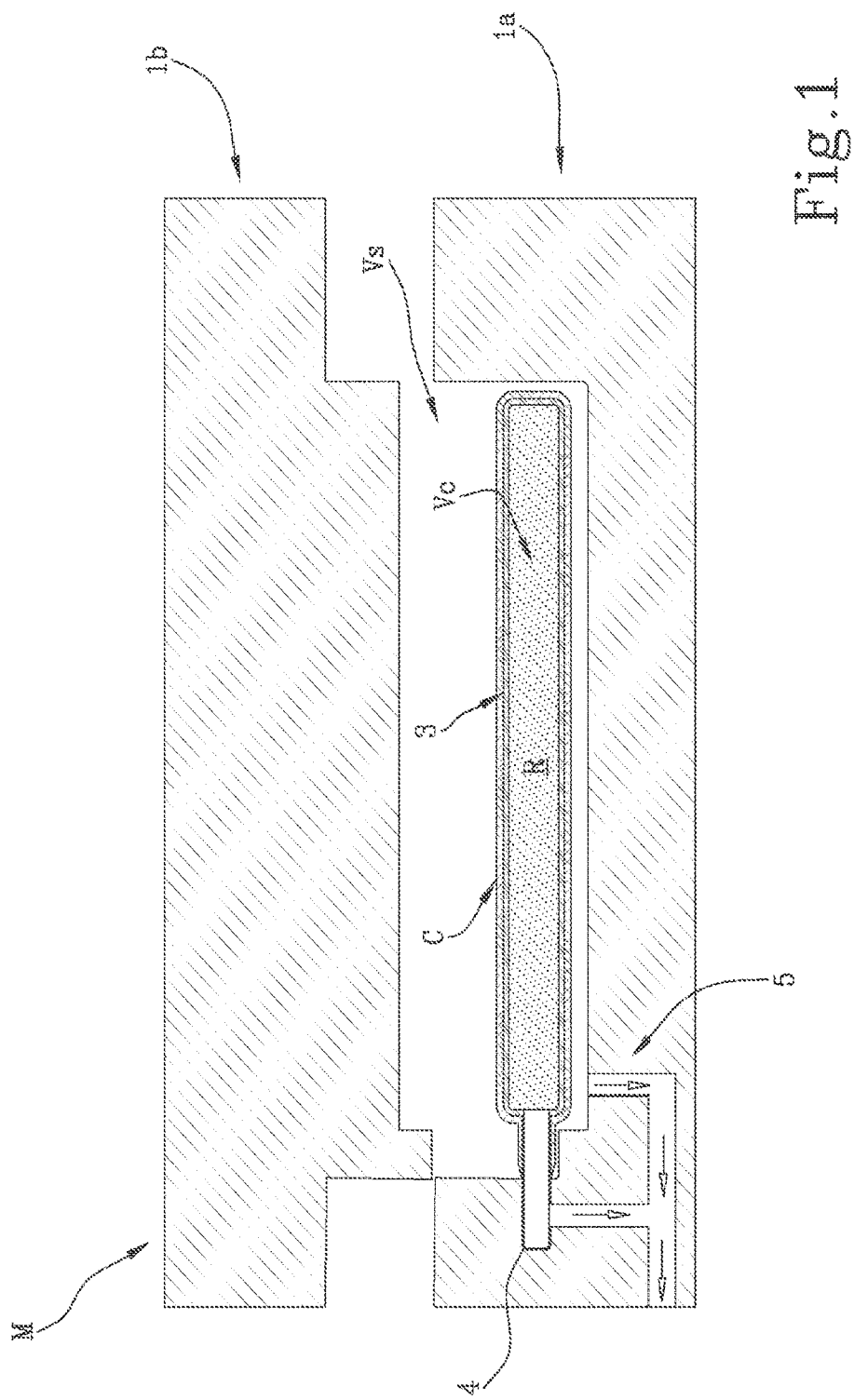
FIG. 1 shows a schematic view of an embodiment of a machine for making a hollow monolithic component, specifically a C-SMC component.

With reference to the accompanying drawings, the letter M denotes a machine for moulding a hollow monolithic component, specifically a C-SMC component.

The machine M comprises a press that is provided with a first half mould 1a and a second half mould 1b defining between them a moulding space Vs in which a charge of material C to be moulded, specifically a charge of C-SMC, is placed in order to obtain the hollow monolithic part.

Preferably, one between the first and the second half mould 1a, 1b of the press is movable, while the other between the first and the second half mould 1a, 1b is stationary and receives the charge of material C to be moulded.

In the embodiments illustrated in the accompanying drawings, it is the second half mould 1b which moves towards and away from the first half mould 1a which, instead, is stationary.

In another possible embodiment, it is the first half mould 1a which moves towards and away from the second half mould 1b which, instead, is stationary.

Alternatively, both of the half moulds 1a, 1b can move towards and away from each other.

According to a further aspect of the invention, the press also comprises movable side carriages configured to allow moulding hollow monolithic components having one or more undercuts. In this situation, the moment the first and the second half mould 1a, 1b are moved, the carriages are also moved and act in conjunction with the half moulds 1a, 1b to define the moulding space Vs and during the subsequent steps of moulding the hollow monolithic component.

To make the cavity of the monolithic component, the machine M also comprises at least one core 3, 4, disposed inside the moulding space Vs and comprising a membrane 3 which delimits a containing space Vc, shaped to form the cavity.

The shape of the membrane 3 is thus determined by the shape of the cavity of the monolithic component to be obtained.

In the embodiments illustrated, the membrane 3 is substantially in the shape of a parallelepiped whose edges are filleted to obtain a hollow, monolithic component with a cavity whose cross section is rectangular with rounded corners.

In other embodiments not illustrated, the membrane 3 may have any shape.

Preferably, the membrane 3 is made of a material selectable from one of the following: liquid silicone rubber; latex rubber; PTE/PE for rotational moulding; low-melting-point polymers for rotational moulding; low-melting-point polymers for thermoforming; thermoplastic polymers for blow moulding; thermoplastic polymers for injection moulding.

Advantageously, these materials allow the membrane 3 to be modelled to adopt the desired shape for the cavity of the monolithic component.

Advantageously, these materials also make the membrane 3 resistant to the high pressure and high temperatures (preferably greater than 150°) which occur during the moulding process but, at the same time, allow it to be easily removed from the hollow monolithic component at the end of the moulding process.

In effect, during the moulding process, the membrane 3 that defines the cavity must not lose its shape (in particular, by compression) or collapse because this would result, at the end of the moulding process, in a component whose cavity is the wrong size or shape or, if the membrane 3 has collapsed, a component without any cavity at all. In this regard, the containing space Vc defined by the membrane 3 is filled with a filling material R such as, for example, oil or granular material, as described in more detail below.

For the purpose of filling, the core 3, 4 also comprises a connector 4, preferably but not limited to, a threaded connector, engaged with the membrane 3. Preferably, the connector 4 is hollow and, on the outside of it, is at least partly covered by the membrane 3 (FIG. 3A) so that while the containing space Vc is being filled, the filling material R is prevented from leaking out of the containing space Vc and altering the composition of the charge of material C.

In other words, the core 3, 4 is made in the form of a contoured bag that can be filled with the filling material R through the at least one connector 4 in order to resist moulding pressure so as to make a cavity inside the monolithic component.

As shown in the accompanying drawings, the machine M also comprises an oil circuit 2, configured to move the movable half mould 1a, 1b, and a vacuum circuit 5, preferably made in the stationary half mould 1a, 1b and configured to create a negative pressure action in the moulding space Vs and to facilitate spreading the charge of material C during the moulding process. In another possible embodiment, the vacuum circuit 5 may be made in the movable half mould 1a, 1b. Alternatively, the vacuum circuit 5 may be made in both of the half moulds 1a, 1b.

Therefore, to implement a moulding method for making a monolithic component internally provided with at least one cavity, specifically a monolithic component made of C-SMC, a press as described in the foregoing is prepared. During this step, the press is prepared in such a way that the half moulds 1a, 1b and, if present, the side carriages, are moved away from each other so that a core as described above can be placed inside the moulding space Vs.

Next, a charge of material C, specifically a charge of C-SMC, is wrapped around the core 3, 4 so that the core is at least partly immersed in the charge C. More in detail, the charge of material C, may be wrapped around the membrane 3 in such a way as to cover the membrane 3 almost entirely or to cover just a part of it only.

As illustrated in the accompanying drawings, the at least one connector 4 protrudes at least partly from the charge of material C so that the core 3, 4 can be fixed inside one between the first and the second half mould 1a, 1b, specifically inside the stationary half mould 1a, 1b.

In other words, in the step of wrapping the charge of material C around the core 3, 4, the core 3, 4 is covered by the charge of material C to be moulded in such a way that the at least one connector 4 is at least partly free of the charge C and the core 3, 4 thus wrapped can be fixed inside the stationary half mould 1a, 1b.

Once the core 3, 4 has been fixed to the stationary half mould 1a, 1b, the containing space Vc of the membrane 3 is filled through the connector 4 with a predetermined quantity of filling material R.

With reference to the embodiment shown in FIG. 1, the containing space Vc is filled with a granular material selectable from one of the following: sand; salt; glass microspheres; honeycomb pellets.

Figure 2:
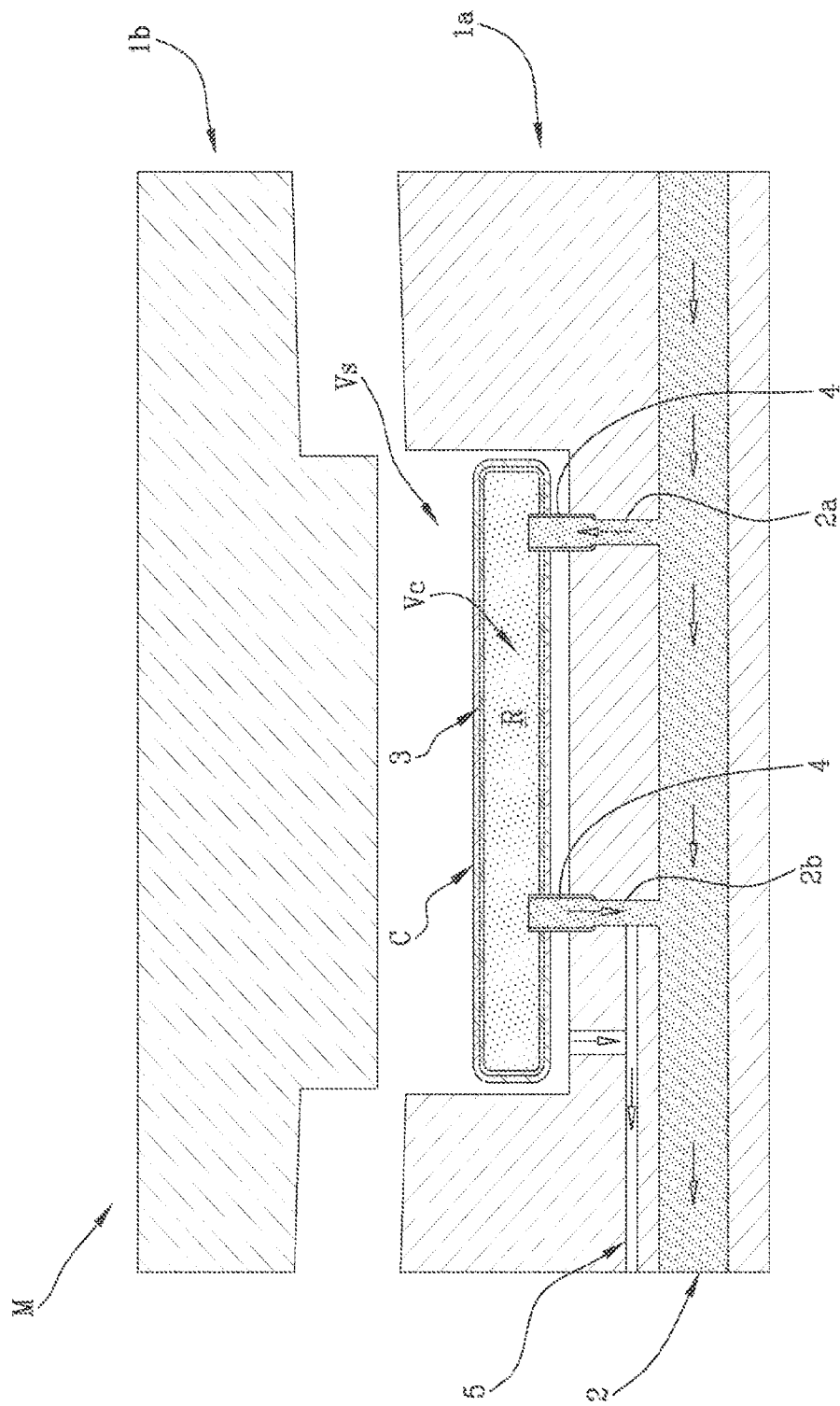
FIG. 2 shows a schematic view of another embodiment of a machine for making a hollow monolithic component, specifically a C-SMC component.

In the embodiments shown in FIGS. 2 and 3, on the other hand, the filling material R is oil from the oil circuit 2 of the press.

More in detail, in these embodiments, in the step of fixing the core 3, 4 in the stationary half mould 1a, 1b, the at least one connector 4 is fixed to the half mould 1a, 1b in proximity to a delivery section 2a of the oil circuit 2. By so doing, the containing space Vc, during the step of filling it, is placed in fluid communication with the delivery section 2a of the oil circuit 2 to allow a predetermined quantity of oil from the oil circuit 2 to flow into the containing space Vc. In this situation, therefore, when the containing space Vc needs to be filled, part of the oil from the oil circuit 2 of the press is made to flow into the containing space Vc through the connector 4.

After the step of filling the containing space Vc of the membrane 3, the method comprises a step in which the two half moulds 1a, 1b and the side carriages, if present, are closed so that the charge of material C and the core 3, 4 are interposed between the first and the second half mould 1a, 1b and thus contained in the moulding space Vs.

After the step of closing the half moulds 1a, 1b, the method further comprises a step of raising the temperature of the charge of material C in such a way that the charge of material C can move within the moulding space Vs and flow along the membrane 3 of the core 3, 4 and spread uniformly in the whole of the moulding space Vs.

The flow percentage of the charge in the moulding space Vs may be high (high flow) or low (low flow) up to 99%. This flow percentage changes according to the mechanical and morphological properties (for example, thickness, size, extraction axis) which the finished part is required to have.

In other words, once the temperature has been raised, the charge of material C can flow in the moulding space Vs to cover all of the membrane 3 and spread in the whole of the moulding space Vs.

In the case where the charge of material C, in the step of wrapping the charge of material C around the membrane 3, is wrapped around the membrane 3 almost entirely (for example, 99% of the surface of the membrane 3, the charge of material C flows in the moulding space less than in the case where the charge of material C is wrapped around the membrane 3 in such a way as to cover only part of the membrane 3.

In a preferred embodiment, the membrane 3 has, on the outside of the containing space Vc, a smooth, polished surface that makes it easier for the charge of material C to flow and spread and allows obtaining a cavity whose surface is free of imperfections and irregularities.

Advantageously, a membrane 3 made in this way allows obtaining parts with excellent dimensional tolerances and high mechanical strength, despite the presence of the cavity.

After the step of filling the containing space Vc and the step of closing the half moulds 1a, 1b (and the side carriages, if present), the method comprises a step of applying a moulding pressure on the charge of material C to form the monolithic component.

Preferably, the moulding pressure applied on the charge of material C is between 8 bar and 300 bar and, still more preferably, the moulding pressure is 120 bar.

If the filling material R is oil from the oil circuit 2 of the press, the moulding pressure is applied on the charge of material C by dilating the membrane 3.

More in detail, after the half moulds 1a, 1b and, if necessary, the movable side carriages, have been closed, an additional quantity of oil is filled into the containing space Vc of the membrane 3 through the delivery section 2a so as to cause the membrane 3 to dilate. Dilating in this way applies a pushing force on the charge of material C, thereby compressing it between the membrane 3 and the half moulds 1a, 1b. In this situation, therefore, the charge of material C is moulded by pressure applied by the oil contained in the containing space Vc, which pushes the membrane 3 from the inside towards the outside of the membrane 3.

If the filling material R is granular material, on the other hand, the step of applying the moulding pressure is accomplished by moving one between the first half mould 1a and the second half mould 1b towards the other between the first half mould 1a and the second half mould 1b while keeping the membrane 3 in a stationary configuration. In this situation, the first half mould 1a is pushed against the second half mould 1b in such a way as to apply pressure on the charge of material C located between them, while there is no active action on the membrane 3, which is neither compressed nor dilated. The movable half mould 1a, 1b is thus pressed against the stationary half mould 1a, 1b in such a way that the charge of material C is compressed against the membrane 3 which, however, does not lose its shape (in particular, by compression) thanks to the presence of the filling material R previously filled into the containing space Vc. If the half moulds 1a, 1b are provided with side carriages, these are moved together with the half moulds 1a, 1b in such a way as to compress the charge of material C to form the required undercuts in the hollow monolithic component.

In other words, the filling material R present in the containing space Vc of the membrane 3 is capable of supporting the moulding pressure applied by the half moulds 1a, 1b (and the side carriages, if present) on the charge of material C so the membrane 3 does not collapse or lose its shape (in particular, by compression) and prevents the monolithic component from being made correctly.

In another possible embodiment, the half moulds 1a, 1b and the membrane 3 can be acted upon simultaneously so that the moulding pressure is applied on the charge of material C simultaneously from the inside to the outside of the containing space Vc of the membrane 3, thanks to the filling material R, and from the outside to the inside, thanks to the movement of the half moulds 1a, 1b towards each other.

In a preferred embodiment, the half moulds 1a, 1b comprise compression chambers to ensure that the correct moulding pressure is applied on the charge of material C. The compression chambers are configured to act as limit stops for the half moulds 1a, 1b during the closing movement but without losing the moulding pressure, which is applied entirely on the charge of material C.

More in detail, in the case where the membrane 3 is filled with granular material, moulding the charge of C-SMC is accomplished by the moulding pressure applied on the charge of material C by the half moulds 1a, 1b. To create a limit stop to the movement of the half moulds 1a, 1b so as to keep the correct moulding pressure, the half moulds 1a, 1b are provided with a vertical compression chamber. When the moulding pressure is applied by the half moulds 1a, 1b, part of the resin contained in the C-SMC charge is pressed out of the moulding space Vs into the compression chamber. In this situation, the resin acts as a limit stop for the half moulds 1a, 1b and at the same time prevents part of the moulding pressure applied on the charge of material C from being lost.

Instead, in the case where the moulding pressure is applied by dilating the membrane 3, the half moulds 1a, 1b are provided with a horizontal compression chamber.

Once the moulding pressure has been applied on the charge of material C to form the hollow monolithic component, the method comprises a step in which the filling material R is emptied out of the containing space Vc.

More specifically, in the embodiment shown in FIG. 1, where the filling material R is granular, the containing space Vc is emptied through the same connector 4 used for filling the containing space with the filling material R.

In the embodiment shown in FIG. 2, where the filling material R used is a predetermined quantity of oil from the oil circuit 2, the step of emptying the containing space Vc is accomplished by putting the containing space in fluid communication with a return section 2b of the oil circuit 2 so as to let the predetermined quantity of oil flow back from the containing space Vc into the oil circuit 2. As shown in FIG. 2, the delivery section 2a and the return section 2b are made inside the stationary half mould 1a, 1b so that once the core 3, 4 has been fixed to the inside of the half mould 1a, 1b, respective connectors 4 can be placed in fluid communication with the sections 2a, 2b to allow oil to flow in and out of the containing space Vc.

In other words, in this embodiment, the containing space Vc is placed in communication by respective connectors 4 with a delivery section 2a and a return section 2b of the oil circuit 2 in such a way as to create an open circuit in which the oil flows in and out of the containing space Vc during the steps of filling and emptying the containing space Vc, respectively.

The embodiment shown in FIG. 3 differs from the embodiment shown in FIG. 2 in that the delivery section 2a and the return section 2b of the oil circuit 2 are one and the same. In other words, in this embodiment, the containing space Vc is placed in fluid communication with the same section 2a, 2b of the oil circuit 2 of the press so as to create a closed circuit in which the oil flows into the containing space Vc during the step of filling and out of it during the step of emptying the containing space Vc.

After the step of emptying the filling material R out of the containing space Vc, the method comprises a step of removing the core 3, 4 from the moulded monolithic component.

To facilitate this step after the step of emptying the containing space Vc, the method comprises a step of activating the vacuum circuit 5 made on at least one between the first and the second half mould 1a, 1b and communicating with the moulding space Vs in such a way as to create a negative pressure action to detach the membrane 3 from the inside surface of the moulded monolithic component.

In this situation, when the step of emptying the containing space Vc is over and before the half moulds 1a, 1b and the side carriages, if present, move away from each other to open the press, the vacuum circuit 5 is activated so that the membrane 3 is detached from the walls of the cavity.

In other words, before the half moulds 1a, 1b are opened, the vacuum circuit 5 creates a sucking action which detaches the membrane 3 from the inside walls of the hollow monolithic component.

Advantageously, this step allows the core 3, 4 to be easily and conveniently removed from the cavity of the monolithic component, avoiding the risk of the membrane 3 of the core 3, 4 remaining trapped inside the cavity and impairing the properties of the component.

Following the steps of activating the vacuum circuit 5 and opening the half moulds 1a, 1b, the method comprises a step of effectively removing the core 3, 4. This step comprises the sub-steps of disengaging the at least one connector 4 from the stationary half mould 1a, 1b and expelling the moulded monolithic component from the press together with the connector 4.

In the embodiments shown in the accompanying drawings, the connectors 4 are threaded connectors which are screwed to the stationary half mould 1a, 1b during the step of fixing the core 3, 4 and unscrewed from it during the aforesaid step of disengaging.

Alternatively, the connectors 4 are connected to the stationary half mould 1a, 1b, hence to the oil circuit, by inserting the connector 4 into a suitably shaped socket made in the stationary half mould 1a, 1b.

Once the moulded monolithic component has been expelled from the press, the connectors 4 are removed from the component and the membrane 3 is at least partly extracted through the openings left by the connectors 4 on the moulded monolithic component.

While the membrane 3 is being extracted through the openings left by the connectors 4 on the moulded monolithic component, part of the membrane 3 might remain inside the cavity. To also remove these portions of the membrane 3 from the cavity, the step of removing the core 3, 4 may comprise the sub-step of making at least one opening in the monolithic component to allow the membrane 3 to be totally or partly extracted.

Advantageously, the possibility of extracting the membrane 3 through the openings left by the connectors 4 or through specially made openings avoids having to mould the part in portions which would subsequently have to be joined but allows directly moulding a monolithic component.

Once at least one opening has been made in the hollow monolithic component, the step of removing the core 3, 4 also comprises the sub-step of raising the temperature of the hollow monolithic component.

In this sub-step, before extracting the membrane 3 through the opening, the entire component is placed in an oven capable of raising the temperature of the component. In this situation, the membrane 3 is softened so it is easier to extract it from the component through the opening just made or the openings left by the connectors 4.

The method then comprises a step of finishing a zone of the moulded monolithic component near the opening left by the at least one connector 4.

As shown in FIG. 3A, during the step of moulding, part of the charge of material C is deposited around the tip of the core 3, 4 where the connector 4 engages the membrane 3. In this situation, when the step of applying the moulding pressure is over, the monolithic component obtained has a sort of "burr" near the connectors 4. This "burr" is eliminated when the connectors 4 and the membrane 3 are removed to give the monolithic component the originally desired shape.

Preferably, in this step of the method, the "burr", if any, formed on the hollow monolithic component in proximity to the compression chamber is also removed.

Preferably, the "burr" is removed by milling and/or perforating.

The invention achieves the preset aims by eliminating the drawbacks of the prior art.

More specifically, the invention provides a method for moulding hollow monolithic components and capable of producing complex components having very good mechanical properties.

The method can also produce BiW parts capable of meeting current market standards.

Moreover, this method is also less expensive than prior art methods and allows obtaining a competitive production rate that meets the productivity requirements of the market.

Advantageously, the membrane 3 allows creating a cavity of desired shape in the monolithic component easily and reliably.

The invention claimed is:

1. A molding method for making a monolithic component internally including at least one cavity, comprising the following steps:
providing that the monolithic component internally including the at least one cavity is made of C-SMC;
providing a press comprising a first half mold and a second half mold, with one between the first half mold and the second half mold being a movable half mold and the other between the first half mold and the second half mold being a stationary half mold, the first half mold and the second half mold defining between them a molding space, the press also comprising movable side carriages acting in conjunction with the first half mold and the second half mold to define the molding space;
providing an oil circuit containing oil and configured for using the oil to move the movable half mold to open and close the molding space;
placing at least one core inside the molding space, wherein the core comprises a membrane, the membrane delimiting a containing space which is shaped to form the at least one cavity of the monolithic component, and at least one connector engaged with the membrane and configured to allow filling the containing space;
wrapping a charge of material to be molded around the core so that the core is at least partly immersed in the charge of material;
fixing the core inside the stationary half mold;
filling the containing space of the membrane with a filling material through the connector;
after closing the first half mold and the second half mold using the oil from the oil circuit, applying a molding pressure on the charge of material to form the monolithic component;
and, after these steps,
emptying the containing space of the filling material;
after opening the first half mold and the second half mold using the oil from the oil circuit, removing the core from the molded monolithic component;
in the step of filling the containing space of the membrane, placing the containing space in fluid communication with a delivery section of the oil circuit to create a feed flow of a predetermined quantity of the oil from the oil circuit to the containing space, the predetermined quantity of oil acting as the filling material for the containing space, and/or in the step of emptying the containing space, placing the containing space in fluid communication with a return section of the oil circuit to create a return flow whereby the predetermined quantity of oil, acting as the filling material for the containing space, flows back from the containing space to the oil circuit;
providing that the membrane has, on an exterior of the containing space, a smooth, polished surface.

2. The method according to claim 1, wherein the delivery section and the return section of the oil circuit coincide with each other.

3. The method according to claim 1, wherein the step of applying the molding pressure comprises feeding an additional quantity of oil into the containing space of the membrane to dilate the membrane so that the membrane applies the molding pressure on the charge of material.

4. The method according to claim 1, wherein between the step of wrapping the charge of material around the core and the step of applying the molding pressure there is a step of raising a temperature of the charge of material.

5. The method according to claim 1, wherein in the step of fixing the core in the stationary half mold, the at least one connector is engaged with the stationary half mold to allow creating a flow of the filling material during the steps of filling and emptying the membrane.

6. The method according to claim 5, wherein after the step of emptying the containing space and opening the first half mold and the second half mold; the method comprises the following steps:
disengaging the at least one connector from the stationary half mold;
expelling the molded monolithic component from the press together with the at least one connector.

7. The method according to claim 1, wherein the step of removing the core comprises:
removing the at least one connector from the molded monolithic component;
extracting the membrane at least partly from an opening left by the at least one connector on the molded monolithic component.

8. The method according to claim 7, wherein the step of removing the core is followed by a step of finishing a zone of the molded monolithic component adjacent the opening left by the at least one connector.

9. The method according to claim 1, wherein the step of removing the core from the molded monolithic component comprises:
making at least one opening on the monolithic component, the at least one opening being configured to allow totally or partly extracting the membrane;
raising a temperature of the molded monolithic component to soften the membrane.

10. The method according to claim 1, wherein the step of opening the first half mold and the second half mold is preceded by a step of driving a vacuum circuit made on at least one between the first half mold and the second half mold and communicating with the molding space to create a negative pressure action to detach the membrane from an inside surface of the molded monolithic component.

11. The method according to claim 1, wherein, in the step of filling the containing space of the membrane, the placing of the containing space in fluid communication with the delivery section of the oil circuit to create the feed flow of the predetermined quantity of the oil from the oil circuit to the containing space dilates the membrane, and/or wherein, in the step of emptying the containing space, the placing of the containing space in fluid communication with the return section of the oil circuit to create the return flow whereby the predetermined quantity of oil flows back from the containing space to the oil circuit allows compression of the membrane.

12. A machine for molding a hollow monolithic made of C-SMC, the machine being configured to implement a method according to one or more of the preceding claims and comprising:

a press comprising a first half mold and a second half mold, one between the first half mold and the second half mold being a movable half mold and the other between the first half mold and the second half mold being a stationary half mold, the first half mold and the second half mold defining between them a molding space, the press preferably also comprising movable side carriages acting in conjunction with the first half mold and the second half mold to define the molding space;

at least one core placed inside the molding space and comprising a membrane, the membrane delimiting a containing space which is shaped to form the at least one cavity of the monolithic component, the core also comprising at least one connector engaged with the membrane and configured to allow filling the containing space;

an oil containing oil circuit operatively connected to, and configured to move, via the oil, whichever of the first half mold or the second half is the movable half mold;

a vacuum circuit configured to create a negative pressure action in the molding space;

wherein the oil circuit comprises a delivery section and a return section placed inside the stationary half mold, the delivery section and the return section being selectively connectable, via the at least one connector, with the containing space to create a fluid communication between the oil circuit and the containing space to respectively create a delivery oil flow from the oil circuit to the containing space and a return oil flow from the containing space to the oil circuit;

wherein the membrane has, on an exterior of the containing space, a smooth, polished surface.

13. The machine according to claim 12, wherein the membrane is made of a material selected from the following: liquid silicone rubber; latex rubber; PTE/PE for rotational molding; low-melting-point polymers for rotational molding; low-melting-point polymers for thermoforming; thermoplastic polymers for blow molding; or thermoplastic polymers for injection molding.

14. The machine according to claim 12, wherein the creating fluid communication between the oil circuit and the containing space to respectively create the delivery oil flow from the oil circuit to the containing space dilates the membrane and the return oil flow from the containing space to the oil circuit allows compression of the membrane.

* * * * *